US012623231B2

(12) United States Patent
Chou et al.

(10) Patent No.: US 12,623,231 B2
(45) Date of Patent: May 12, 2026

(54) MAGNETIC SUBSTANCE SEPARATION DEVICE

(71) Applicant: INNOCELL TECHNOLOGY CO., LTD., Taipei City (TW)

(72) Inventors: Nien-Jen Chou, Hsinchu City (TW); Nien-Tzu Chou, Hsinchu City (TW); Li-An Wu, New Taipei City (TW); Su feng Chiou, Miaoli County (TW)

(73) Assignee: INNOCELL TECHNOLOGY CO., LTD., Taipei City (TW)

( * ) Notice: Subject to any disclaimer, the term of this patent is extended or adjusted under 35 U.S.C. 154(b) by 0 days.

(21) Appl. No.: 19/002,867

(22) Filed: Dec. 27, 2024

(65) Prior Publication Data

US 2025/0242357 A1 Jul. 31, 2025

Related U.S. Application Data

(60) Provisional application No. 63/615,650, filed on Dec. 28, 2023.

(51) Int. Cl.

| | |
|---|---|
| ***B03C 1/08*** | (2006.01) |
| ***B01L 3/00*** | (2006.01) |
| ***B03C 1/32*** | (2006.01) |

(52) U.S. Cl.

CPC ................ *B03C 1/08* (2013.01); *B01L 3/505* (2013.01); *B03C 1/32* (2013.01); *B01L 2300/0609* (2013.01)

(58) Field of Classification Search

CPC .......... B03C 1/08; B03C 1/0332; B03C 1/034

(Continued)

(56) References Cited

U.S. PATENT DOCUMENTS

| | | | |
|---|---|---|---|
| 8,088,285 | B2 | 1/2012 | Siddiqi |
| 8,701,893 | B2 | 4/2014 | Tung et al. |

(Continued)

FOREIGN PATENT DOCUMENTS

| | | | |
|---|---|---|---|
| CN | 101319976 | A | 12/2008 |
| CN | 103920585 | A | 7/2014 |

(Continued)

OTHER PUBLICATIONS

TW Office Action dated Aug. 15, 2025 in application No. 113151190.

(Continued)

*Primary Examiner* — Molly K Devine

(74) *Attorney, Agent, or Firm* — MUNCY, GEISSLER, OLDS & LOWE, P.C.

(57) ABSTRACT

A magnetic substance separation device is configured for attracting magnetic substances in a sample within a sample container. The magnetic substance separation device includes a casing and at least one magnetic component assembly. The casing has at least one accommodation compartment. The at least one magnetic component assembly is disposed in the at least one accommodation compartment, and the at least one magnetic component assembly includes at least four cubic magnetic components. In addition, the at least four cubic magnetic components are linearly arranged with different magnetization directions, allowing magnetic field lines of the at least one magnetic component assembly to concentrate on one side, such that the at least one magnetic component assembly forms at least one strong magnetic surface on the casing. The at least one strong magnetic surface is configured to attract the magnetic substances in the sample within the sample container.

8 Claims, 11 Drawing Sheets

(58) Field of Classification Search
USPC ............................................... 209/215, 223.1
See application file for complete search history.

(56) References Cited

U.S. PATENT DOCUMENTS

| | | | | |
|---|---|---|---|---|
| 9,199,247 | B2 * | 12/2015 | Ellis ........................ | B03C 1/288 |
| 11,260,400 | B2 * | 3/2022 | Zhu ......................... | B03C 1/288 |
| 2019/0161748 | A1 * | 5/2019 | Jervis ..................... | G01N 33/53 |

FOREIGN PATENT DOCUMENTS

| | | | |
|---|---|---|---|
| CN | 204039380 | U | 12/2014 |
| CN | 107541462 | A | 1/2018 |
| CN | 114902044 | A | 8/2022 |
| CN | 115851878 | A | 3/2023 |
| CN | 116042386 | A | 5/2023 |
| CN | 116103116 | A | 5/2023 |
| TW | 200904534 | A | 2/2009 |
| TW | 201121655 | A | 7/2011 |
| TW | 201518498 | A | 5/2015 |
| TW | 202212560 | A | 4/2022 |
| WO | 9216844 | A1 | 10/1992 |
| WO | 2006/109529 | A1 | 10/2006 |

OTHER PUBLICATIONS

TW Office Action dated Aug. 15, 2025 as received in Application No. 113151189.
Bruce L. Levine et al., "Large-Scale Production of CD4+ T Cells from HIV-1-Infected Donors After CD3/CD28 Costimulation", Journal of Hematotherapy 7:437-448 (1998).

* cited by examiner

MAGNETIC SUBSTANCE SEPARATION DEVICE

CROSS-REFERENCE TO RELATED APPLICATIONS

This application claims priority to U.S. Provisional Application Ser. No. 63/615,650, filed on Dec. 28, 2023, the entirety of which is incorporated by reference herein.

TECHNICAL FIELD

This disclosure relates to a magnetic substance separation device.

BACKGROUND

Conventional magnetic substances separation experiments often face multiple challenges. First of all, the magnetic force of magnetic substances from different manufacturers varies significantly, as well as the characteristics of biological samples (such as encapsulation phenomena) can affect the magnetic interaction, resulting in reduced separation efficiency. Secondly, the diversity of experimental containers makes it difficult to optimize magnetic interactions. Additionally, the relationship between magnetic force and distance also affects the separation effect. Conventional magnetic separation devices often struggle to balance efficiency, convenience, automation, biosafety and biocompatibility, limiting the advancement of magnetic separation experiments.

Therefore, how to provide a magnetic separation device that meets the requirements for efficiency, convenience, automation, biosafety and biocompatibility, while allowing flexible selections of suitable container shapes, surface materials and surface treatment methods according to the characteristics of different samples, remains a pressing challenge in this field for researchers.

SUMMARY

The present disclosure provides a magnetic substance separation device that enhances the efficiency of magnetic interactions by optimizing the arrangement of magnets, utilizing a strong magnetic force design, and adapting to different container shapes, thereby offering a more comprehensive and reliable solution for magnetic substance separation experiments.

One embodiment of the disclosure provides a magnetic substance separation device configured for attracting magnetic substances in a sample within a sample container. The magnetic substance separation device includes a casing and at least one magnetic component assembly. The casing has at least one accommodation compartment. The at least one magnetic component assembly is disposed in the at least one accommodation compartment, and the at least one magnetic component assembly includes at least four cubic magnetic components. In addition, the at least four cubic magnetic components are linearly arranged with different magnetization directions, allowing magnetic field lines of the at least one magnetic component assembly to concentrate on one side, such that the at least one magnetic component assembly forms at least one strong magnetic surface on the casing. The at least one strong magnetic surface is configured to attract the magnetic substances in the sample within the sample container.

According to the magnetic substance separation device as disclosed in the embodiment of the disclosure, a strong magnetic surface can be formed on the casing by arranging the cubic magnetic components in a specific manner, thereby providing stronger magnetic force per unit area with fewer magnetic components. Furthermore, the magnetic substance separation device can be adjusted to adapt to different container shapes, thereby improving the efficiency of magnetic interactions while meeting the requirements for efficiency, convenience, automation, biosafety and biocompatibility simultaneously.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
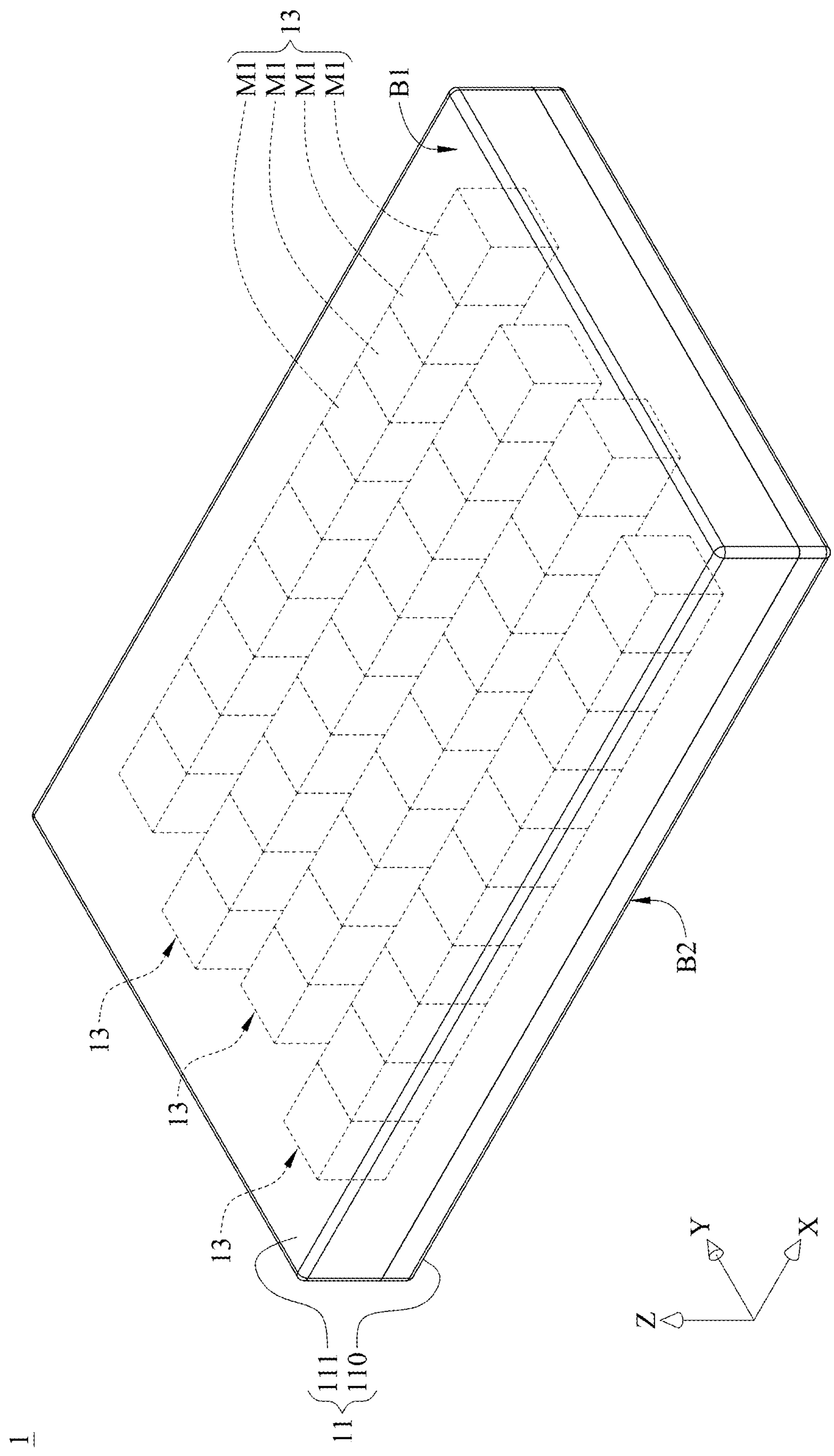
FIG. 1 is a perspective view of a magnetic substance separation device in accordance with the first embodiment of the disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

It should be understood that the following description provides various embodiments or examples for implementing different aspects of the present disclosure. The specific components and arrangements described below are merely simplified explanations of the disclosure, provided for illustrative purposes and not as limitations. The term "about" as used in the present disclosure refers to a value that includes the stated value as well as values within an acceptable range of deviation, considering measurement issues and errors (i.e., the limitations of the measurement system) by those skilled in the art. For example, "about" can mean within one or more standard deviations of the stated value or within ±5% of the stated value. Quantities provided herein are approximate, meaning that even if terms such as "about," "approximately," or "substantially" are not explicitly stated, they may still be implied. Additionally, the expression "a to b" as used in the present disclosure indicates a range that includes values greater than or equal to "a" and less than or equal to "b".

It can be understood that although terms like "first", "second", "third" and so on may be used herein to describe various components, regions, layers, and/or portions, these components, regions, layers, and/or portions should not be limited by these terms. These terms are used solely to distinguish one component, region, layer, and/or portion from another. Thus, a "first" component, region, layer, and/or portion discussed below could be referred to as a "second" component, region, layer, and/or portion without departing from the teachings of the embodiments of the disclosure.

The present disclosure provides a magnetic substance separation device for attracting magnetic substances in a sample within a sample container, thereby achieving the purpose of separating the magnetic substances from the sample, but its application is not limited to separating magnetic substances from samples. In some aspects, the magnetic substance separation device may also be configured to separate substances attracted or linked to magnetic substances, and whether the separated substances are to be retained or discarded depends on the purpose of the experiment.

According to the present disclosure, the magnetic substance separation device includes a casing and at least one magnetic component assembly. The casing has at least one accommodation compartment. The at least one magnetic component assembly is disposed in the at least one accommodation compartment, and the at least one magnetic component assembly includes at least four cubic magnetic components. Furthermore, the at least four cubic magnetic components are linearly arranged with different magnetization directions, allowing magnetic field lines of the at least one magnetic component assembly to concentrate on one side, such that the magnetic component assembly forms at least one strong magnetic surface on the casing, and the at least one strong magnetic surface is configured to attract the magnetic substances in the sample within the sample container. The cubic magnetic components being linearly arranged with different magnetization directions may refer to that the magnetization direction of each cubic magnetic component rotates according to a specific pattern. For example, the magnetization direction of each sequentially arranged cubic magnetic component is rotated by 90 degrees relative to the magnetization direction of the preceding cubic magnetic component.

In one aspect, the at least four cubic magnetic components are, for example, arranged in Halbach array.

In one aspect, the magnetic component assembly may further form a weak magnetic surface on the casing, and the weak magnetic surface and the strong magnetic surface may be located on opposite sides of the casing. It should be noted that in configurations where the casing is, for example, plate-shaped, the strong magnetic surface is defined as being located on a reference plane formed by an X-axis a Y-axis. An extension direction of the accommodation compartment in the casing may, for example, be parallel to the X-axis or the Y-axis, allowing the magnetic component assembly to have a more flexible configuration based on the actual design requirements, but the present disclosure is not limited to the aforementioned extension directions of the accommodation compartment in the casing.

In one aspect, the at least one magnetic component assembly may include a plurality of magnetic component assemblies, the at least one accommodation compartment may include a plurality of accommodation compartments, and the magnetic component assemblies are respectively disposed in the accommodation compartments. In other words, the number of magnetic component assemblies may be multiple, and the number of accommodation compartments may also be multiple. In addition, the number of magnetic component assemblies may correspond to the number of accommodation compartments, allowing each magnetic component assembly to be disposed in a respective accommodation compartment. Moreover, the cubic magnetic components in one of the accommodation compartments may be arranged in alignment with the cubic magnetic components in another of the accommodation compartments, but the disclosure is not limited thereto. In other configurations, the cubic magnetic components in one of the accommodation compartments may be arranged in an offset configuration relative to the cubic magnetic components in another of the accommodation compartments.

In one aspect, each two adjacent cubic magnetic components within the same accommodation compartment may be in physical contact with each other, but the disclosure is not limited thereto. In other configurations, there may be a gap between each two adjacent cubic magnetic components within the same accommodation compartment, and the gap is, for example, greater than 0 mm and less than or equal to 2.0 mm.

In configurations where the number of accommodation compartments is multiple, the casing may have a plurality of partitions, and the partitions are respectively disposed between two adjacent accommodation compartments. In other words, the partitions of the casing can divide an internal space of the casing into multiple accommodation compartments, each designed to house a magnetic component assembly. Moreover, a thickness of each of the partitions may be a value ranging from 1.0 mm to 10.0 mm. Preferably, the thickness of each of the partitions may be a value ranging from 1.5 mm to 7.9 mm. For example, in one configuration, the thickness of each partition of the casing may be substantially 1.5 mm; in another configuration, the thickness of each partition of the casing may be substantially 1.8 mm; in still another configuration, the thickness of each partition of the casing may be substantially 4.8 mm; in yet another configuration, the thickness of each partition of the casing may be substantially 7.9 mm.

According to the magnetic substance separation device of the present disclosure, a thickness of the casing at the strong magnetic surface may be a value ranging from 1.0 mm to 2.0 mm. For example, in one configuration, the casing thickness of the casing at the strong magnetic surface may be substantially 1.0 mm; in another configuration, the casing thickness of the casing at the strong magnetic surface may be substantially 1.5 mm; in still another configuration, the casing thickness of the casing at the strong magnetic surface may be substantially 1.8 mm; in yet another configuration, the casing thickness of the casing at the strong magnetic surface may be substantially 2.0 mm.

In one configuration, the magnetic component assembly may be in physical contact with an inner peripheral surface of the accommodation compartment, but the disclosure is not limited thereto. In other configurations, there may be a gap between the magnetic component assembly and at least part of the inner peripheral surface of the accommodation compartment.

According to the magnetic substance separation device of the present disclosure, a side length of each cubic magnetic component may be a value ranging from 1 mm to 15 mm. Preferably, the side length of each cubic magnetic component may be a value ranging from 3 mm to 10 mm. For example, in one configuration, the side length of each cubic magnetic component of the magnetic component assembly may be substantially 3 mm; in another configuration, the side length of each cubic magnetic component of the magnetic component assembly may be substantially 5 mm; in still another configuration, the side length of each cubic magnetic component of the magnetic component assembly may be substantially 10 mm.

In one configuration, the magnetic substance separation device may further include a holder disposed on the casing, and the holder is configured to secure the sample container onto the strong magnetic surface of the casing.

In one configuration, the magnetic substance separation device may further include an inclined support pivotally coupled to an end of the casing, and the inclined support is configured to selectively raise a horizontal height of the end of the casing to be greater than or equal to a horizontal height of other parts of the casing.

In configurations where the magnetic substance separation device includes a holder, the holder may be a support frame disposed on an upper end of the casing. Additionally, the holder (e.g., support frame) may have at least one through hole, and the sample container may be, for example, a centrifuge tube. The through hole is configured for a tube part of the sample container (e.g., centrifuge tube) to be disposed through, allowing the tube part to correspond to the strong magnetic surface, and a periphery of the through hole is configured to support an opening flange part of the sample container (e.g., centrifuge tube).

First Embodiment

Figure 2:
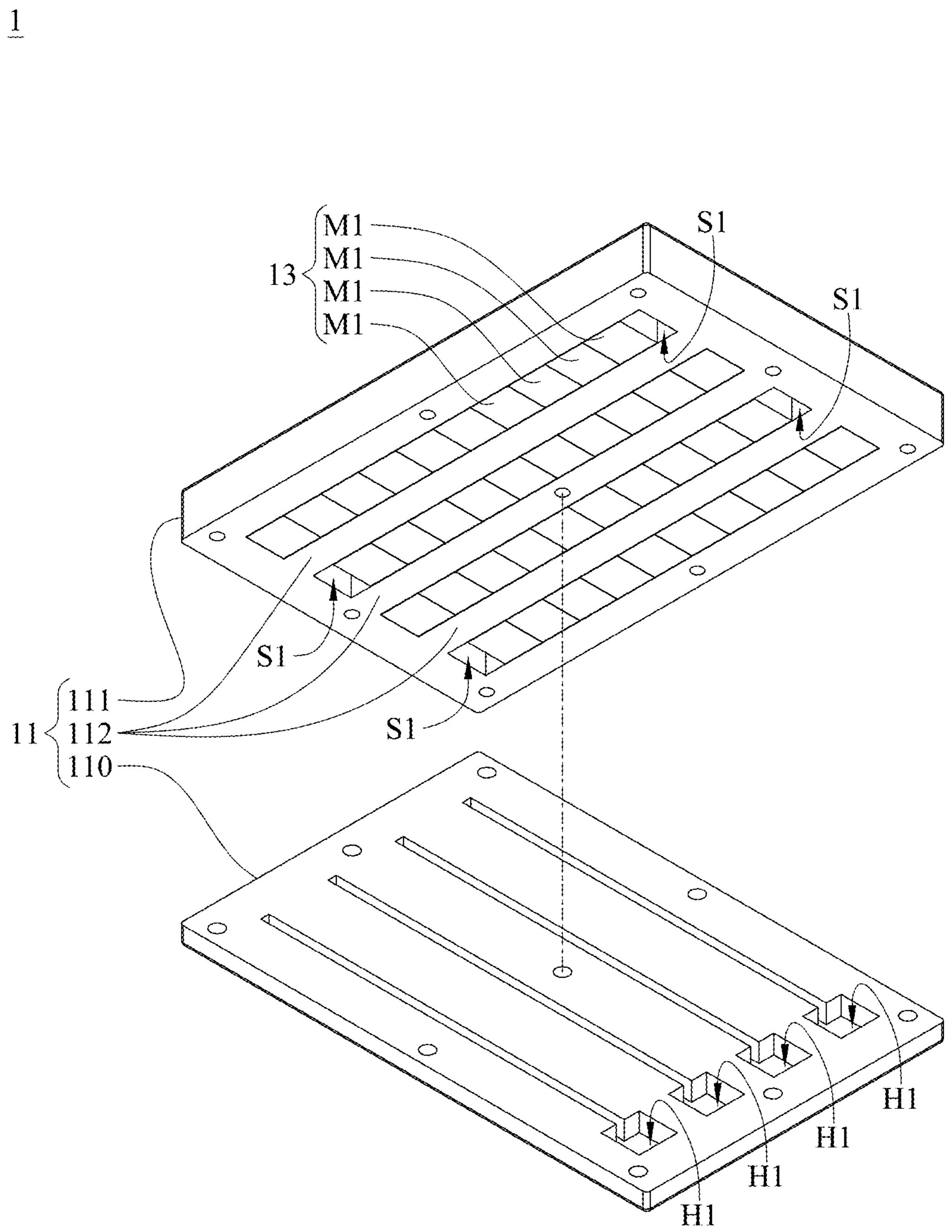
FIG. 2 is an exploded view of the magnetic substance separation device as shown in FIG. 1.

Referring to FIG. 1 and FIG. 2, FIG. 1 is a perspective view of a magnetic substance separation device in accordance with the first embodiment of the disclosure, and FIG. 2 is an exploded view of the magnetic substance separation device as shown in FIG. 1.

In this embodiment, the magnetic substance separation device 1 is configured to attract magnetic substances in a sample within a sample container (not shown). The magnetic substance separation device 1 includes a casing 11 and a plurality of magnetic component assemblies 13.

In this embodiment, the casing 11 has four accommodation compartments S1, and the four accommodation compartments S1 are parallel to each other. Specifically, the casing 11 includes a main housing 111, three partitions 112 and a base 110. The three partitions 112 are arranged in the main housing 111 to form four parallel elongated grooves on the main housing 111. The base 110 is secured to the main housing 111, for example (but not limited to), by screws, thereby forming the four accommodation compartments S1 together with the main housing 111 and the partitions 112. Moreover, the partitions 112 are respectively disposed between two adjacent accommodation compartments S1. Additionally, the base 110 has four openings H1 respectively connected to the four accommodation compartments S1, allowing the magnetic component assemblies 13 to be inserted into the accommodation compartments S1 via the openings H1.

As shown in FIG. 1, a length direction and a width direction of the casing 11 correspond to an X-axis direction and a Y-axis direction, respectively. In this embodiment, an extension direction of the accommodation compartments S1 is substantially parallel to the X-axis direction, which can be considered as extending along the length direction of the casing 11, but the disclosure is not limited thereto. In other embodiments, the extension direction of the accommodation compartments in the casing can be substantially parallel to the Y-axis direction, meaning the accommodation compartments can extend along the width direction of the casing.

In this embodiment, the partitions 112 are integrally formed with the main housing 111, but the present disclosure is not limited to the aforementioned structural configuration. In other embodiments, the main housing, partitions, and base may be integrally formed as a single casing.

In this embodiment, the four magnetic component assemblies 13 are respectively disposed in the four accommodation compartments S1. In addition, each of the magnetic component assemblies 13 includes at least four cubic magnetic components M1. In other words, each accommodation compartment S1 houses at least four cubic magnetic components M1. During assembly, the cubic magnetic components M1 are inserted into the accommodation compartments S1 through the openings H1. Moreover, the cubic magnetic components M1 are linearly arranged with different magnetization directions, allowing magnetic field lines of the magnetic component assemblies 13 to concentrate on one side.

Figure 3:
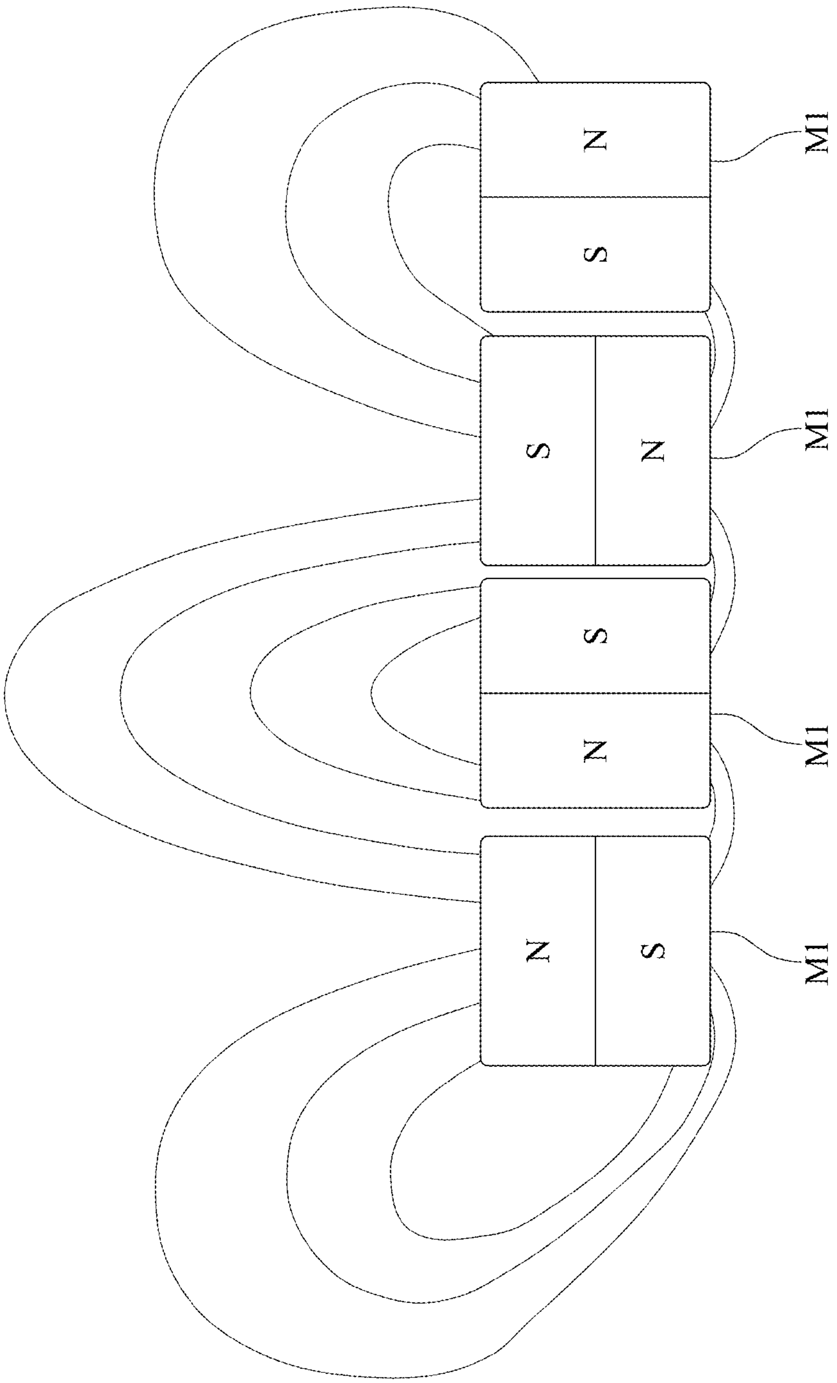
FIG. 3 illustrates a schematic diagram of the magnetic force distribution formed by four cubic magnetic components linearly arranged with different magnetization directions.
Figure 4:
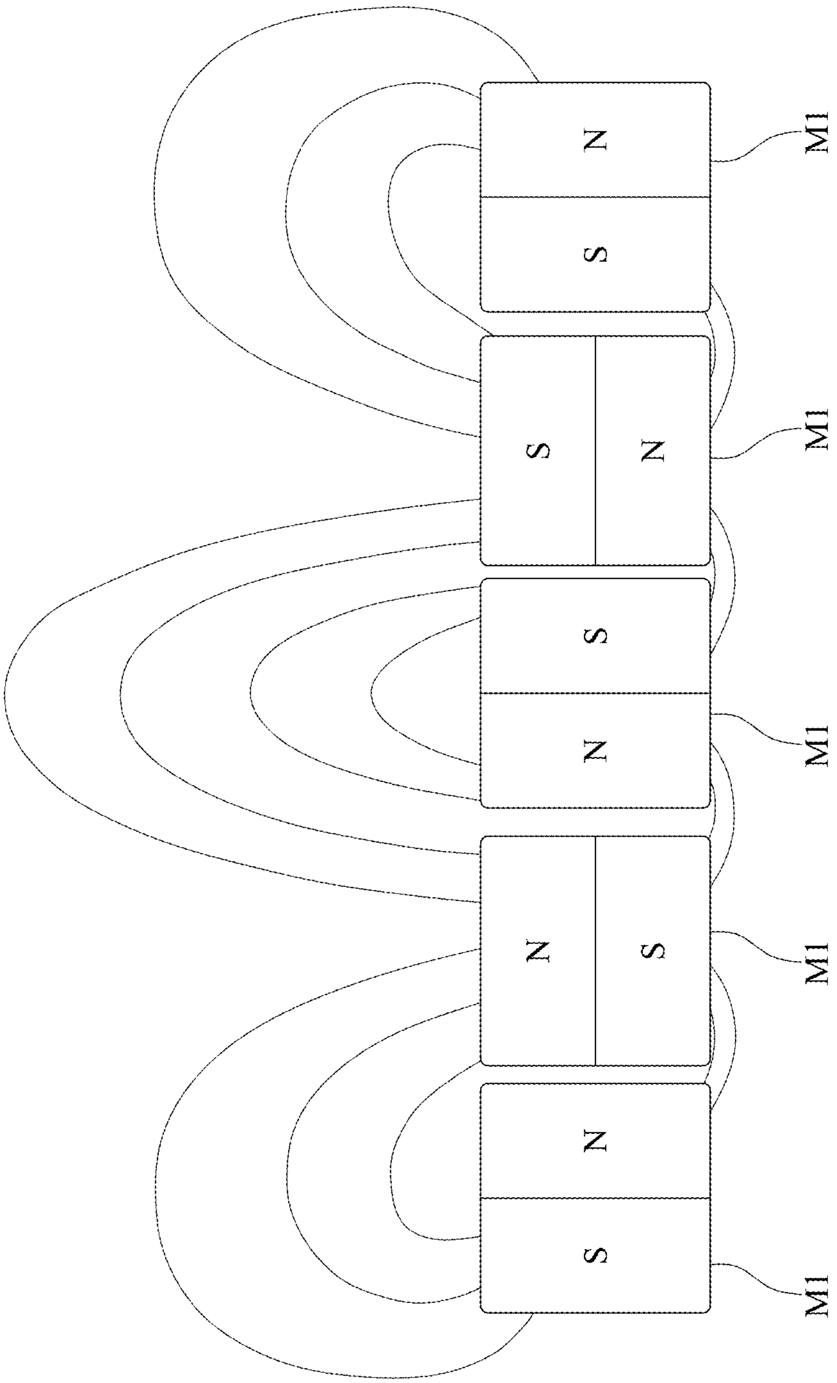
FIG. 4 illustrates a schematic diagram of the magnetic force distribution formed by five cubic magnetic components linearly arranged with different magnetization directions.

Further referring to FIG. 3 and FIG. 4, FIG. 3 illustrates a schematic diagram of the magnetic force distribution formed by four cubic magnetic components linearly arranged with different magnetization directions, and FIG. 4 illustrates a schematic diagram of the magnetic force distribution formed by five cubic magnetic components linearly arranged with different magnetization directions. As shown in FIG. 3 and FIG. 4, a strong magnetic region can be formed on one side of the cubic magnetic components M1 by arranging the cubic magnetic components M1 linearly with different magnetization directions, and a weak magnetic region can be formed on the other side of the cubic magnetic components M1, which allows a strong magnetic force to be generated in one acting direction (acting surface) using fewer magnetic components, thereby providing stronger magnetic force per unit area. The linear arrangement of cubic magnetic components with different magnetization directions involves arranging multiple cubic magnetic components with N and S poles in a specific pattern (which may be, for example, Halbach array), as shown in FIG. 3 and FIG. 4. The number of cubic magnetic components M1 in FIG. 3 or in FIG. 4 is provided only as an example, and the present disclosure is not limited to the specific number as shown in FIG. 3 and FIG. 4. In some embodiments of the disclosure, each magnetic component assembly may include six or more cubic magnetic components. The aforementioned cubic magnetic components M1 may be, for example, magnets with N and S poles, but the disclosure is not limited thereto.

By the above arrangement of the cubic magnetic components M1, the four magnetic component assemblies 13 form a strong magnetic surface B1 and a weak magnetic surface B2 on opposite sides of the casing 11. The strong magnetic surface B1 is configured to attract magnetic substances in the sample within the sample container. In specific, the strong magnetic surface B1 is located on a surface of the main housing 111 that is furthest from the base 110, and the weak magnetic surface B2 is located on a surface of the base 110 that is furthest from the main housing 111.

In this embodiment, the cubic magnetic components M1 are all cubes. In other words, each face of the cubic magnetic components M1 is a square. It should be noted that the term "cube" may refer to a perfect cube as well as a rectangular cuboid whose shape closely approximates a perfect cube due to manufacturing tolerances.

In this embodiment, the cubic magnetic components M1 in one of the accommodation compartments S1 are arranged in an offset configuration relative to the cubic magnetic components M1 in adjacent one of the accommodation compartments S1, but the disclosure is not limited thereto. In other embodiments, the cubic magnetic components in any adjacent two of the accommodation compartments may be arranged in alignment with each other.

In this embodiment, each two adjacent cubic magnetic components M1 within the same accommodation compartment S1 are in physical contact with each other, but the disclosure is not limited thereto. In other embodiments, there may be a gap between each two adjacent cubic magnetic components. A distance between adjacent two cubic magnetic components within a single accommodation compartment may, for example, be controlled by limiting these cubic magnetic components using wall surfaces at both ends of the accommodation compartment. For instance, when the length of the accommodation compartment is substantially equal to the total length of the cubic magnetic components within the accommodation compartment, the wall surfaces at both ends of the accommodation compartment will press against the outermost cubic magnetic components, causing the cubic magnetic components within the accommodation compartment to be tightly adjacent to each other. Conversely, when the length of the accommodation compartment is greater than the total length of the cubic magnetic components within the accommodation compartment, a gap may exist between any adjacent two cubic magnetic components, for example, due to repulsive forces.

In this embodiment, the cubic magnetic components M1 are in physical contact with an inner peripheral surface of the accommodation compartment S1. By matching the shape of the cubic magnetic components M1 to the shape of the accommodation compartment S1, unexpected rotation of the cubic magnetic components M1 within the accommodation compartment S1 can be prevented, thereby ensuring the structural configuration of the cubic magnetic components M1 being linearly arranged with different magnetization directions.

In the magnetic substance separation device 1 of this embodiment, the number of the accommodation compartments S1 is four, each accommodation compartment S1 receives ten cubic magnetic components M1, a side length of each cubic magnetic component M1 is substantially 10 mm, and a thickness of each partition 112 is substantially 7.9 mm. Additionally, a thickness of the casing 11 at the strong magnetic surface B1 is substantially 2.0 mm. Under the aforementioned configuration, the strong magnetic surface B1 formed by the magnetic component assemblies 13 on the casing 11 can achieve a magnetic field strength of approximately 600 to 1000 gauss. Under the same conditions, a conventional magnet arrangement produces a magnetic field strength of only about 50 to 300 gauss on a single surface of the casing, which is significantly weaker than the magnetic field strength generated by the magnetic component assemblies 13 on the strong magnetic surface B1 in this embodiment. It can be known that in the embodiments of the disclosure, by linearly arranging the cubic magnetic components with different magnetization directions, the magnetic field lines of the magnetic component assemblies can be concentrated on one side, enabling a stronger magnetic force per unit area with fewer magnetic components.

In terms of application, magnetic bead separation tests were conducted using the magnetic substance separation device 1 of this embodiment during a cell culture process. The initial number of added cells and magnetic beads was $5\times10^6$ each. After 14 days of co-culture, magnetic bead separation was performed using the magnetic substance separation device 1 of this embodiment. The results showed that with a cell number of $1\times10^6$, the residual magnetic bead number could be reduced to less than 15, or even less than 10, which meets the recommendation that the residual magnetic bead number should be less than 30 (reference: JOURNAL OF HEMATOTHERAPY 7:437-448 (1998)).

According to the present disclosure, a size of the strong magnetic surface in the magnetic substance separation device may be designed to be greater than or equal to a surface area of the sample container, depending on actual requirements. For example, the size of the strong magnetic surface can be adjusted by modifying the number of accommodation compartments, the number of cubic magnetic components, the size of the cubic magnetic components, and/or the arrangement density of the cubic magnetic components.

Second Embodiment

Figure 5:
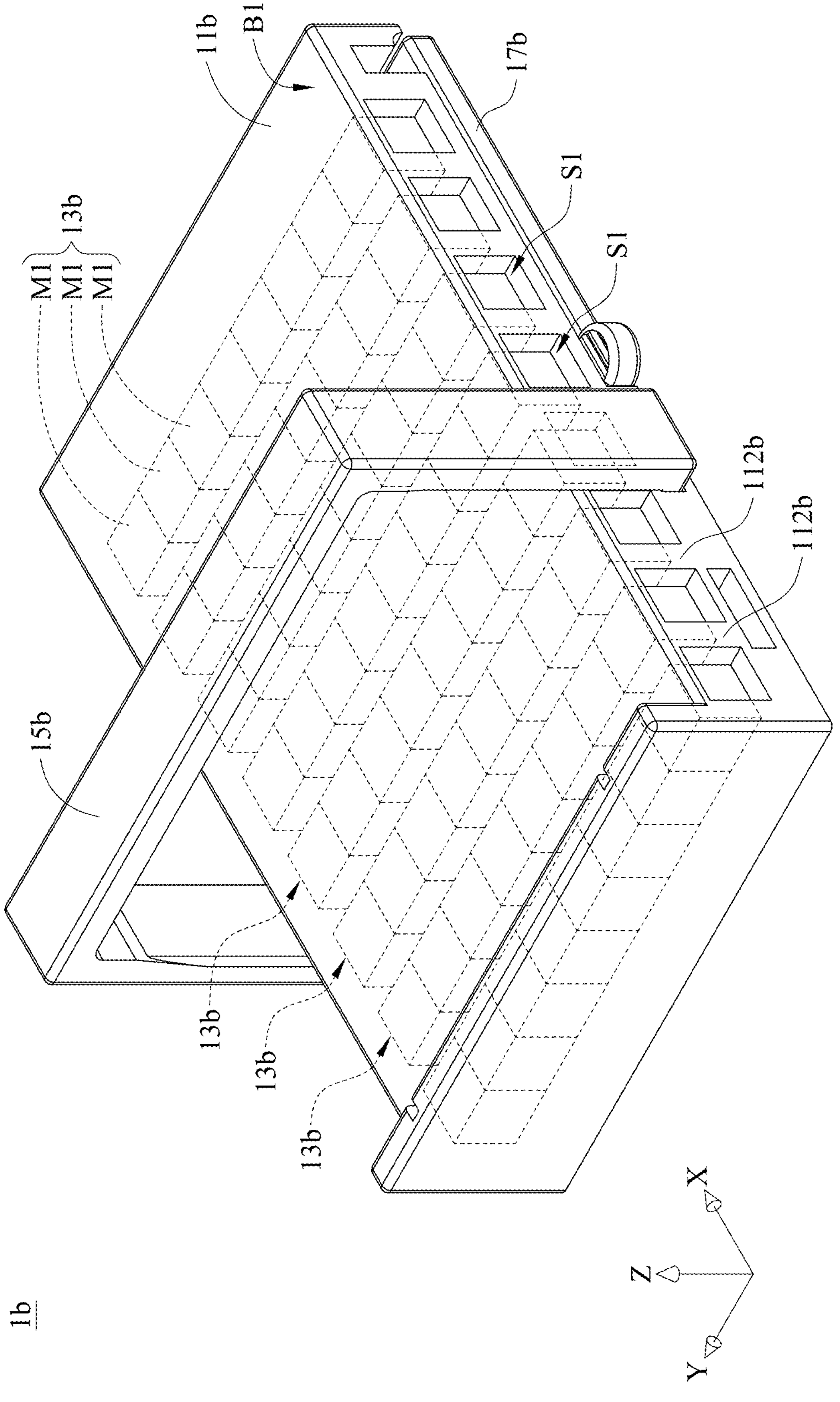
FIG. 5 is a perspective view of a magnetic substance separation device in accordance with the second embodiment of the disclosure.
Figure 6:
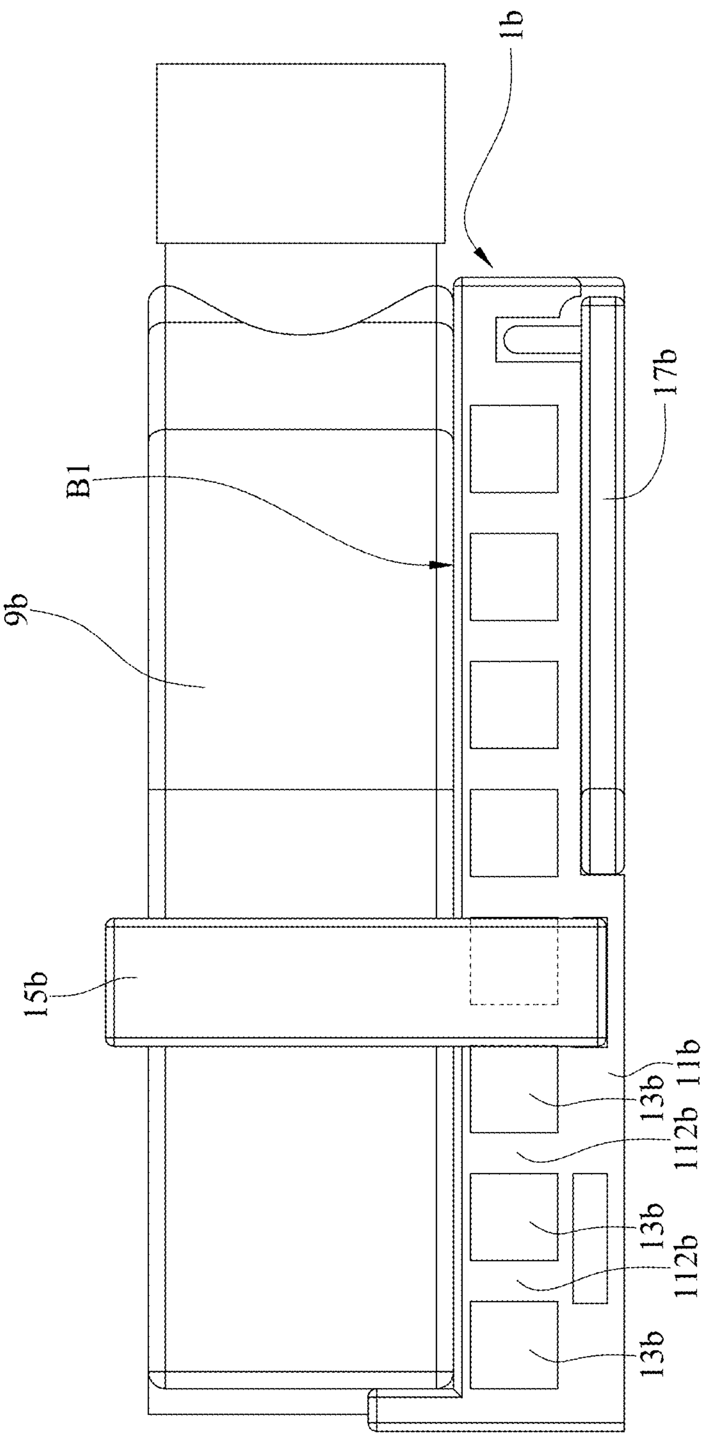
FIG. 6 is a side view of the magnetic substance separation device as shown in FIG. 5 and a sample container in a horizontal placement.
Figure 7:
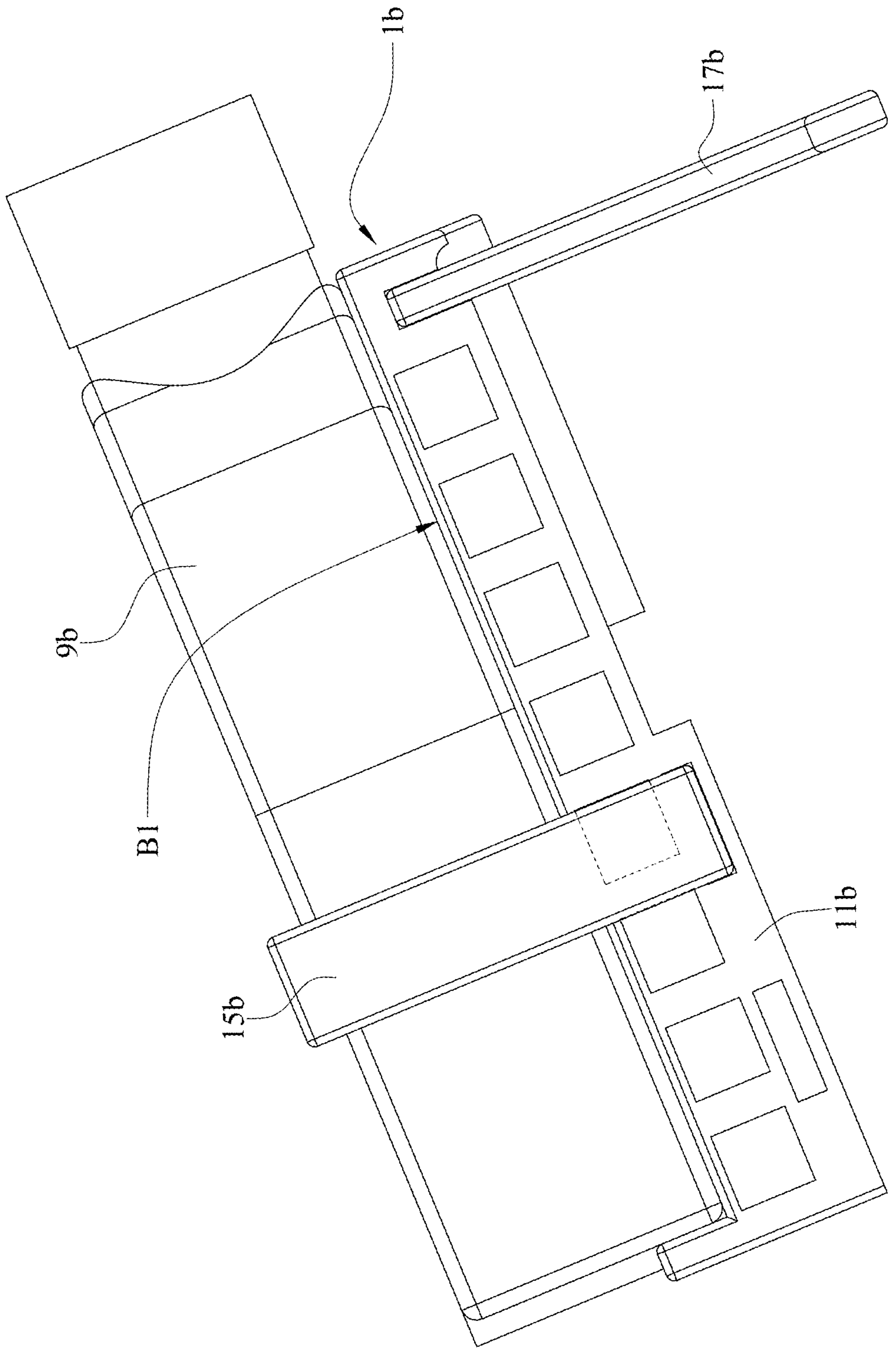
FIG. 7 is a side view of the magnetic substance separation device as shown in FIG. 5 and the sample container in an inclined placement.

Referring to FIG. 5 to FIG. 7, FIG. 5 is a perspective view of a magnetic substance separation device in accordance with the second embodiment of the disclosure, FIG. 6 is a side view of the magnetic substance separation device as shown in FIG. 5 and a sample container in a horizontal placement, and FIG. 7 is a side view of the magnetic substance separation device as shown in FIG. 5 and the sample container in an inclined placement.

A magnetic substance separation device **1*b* provided in the second embodiment (corresponding to FIG. 5) is similar to the magnetic substance separation device 1 as described in the first embodiment (corresponding to FIG. 1). The same or similar reference numerals indicate the same or similar components, and functions and effects provided by those components are the same as described above, so an explanation in this regard will not be provided again. The following describes only the primary differences between the magnetic substance separation device 1*b* of the second embodiment and the magnetic substance separation device 1** of the first embodiment.

In the second embodiment, a sample container **9*b* is a biocompatibility-certified flask, and the magnetic substance separation device 1*b* further includes a holder 15*b* and an inclined support 17*b*. Additionally, the holder 15*b* is disposed on a casing 11*b*, and the holder 15*b* is configured to secure the sample container 9*b* onto a strong magnetic surface B1 of the casing 11*b***.

The inclined support **17*b* is pivotally coupled to an end of the casing 11*b*, and the inclined support 17*b* is configured to selectively raise a horizontal height of the end of the casing 11*b* to be greater than or equal to a horizontal height of other parts of the casing 11*b*. Specifically, as shown in FIG. 6, when the inclined support 17*b* is in a folded position, the magnetic substance separation device 1***b* and the sample container 9*b* can be placed horizontally on a flat surface, providing a larger interaction area between the sample in the sample container 9*b* and the strong magnetic surface B1. As shown in FIG. 7, when the inclined support 17*b* is pivoted to an unfolded position, the magnetic substance separation device 1*b* and the sample container 9*b* can be placed at an inclined angle on the flat surface, facilitating the extraction of the separated sample.

In the second embodiment, the number of partitions 112*b* is seven, and the number of magnetic component assemblies 13*b* and the number of accommodation compartments S1 are both eight. Each of the magnetic component assemblies 13*b* includes eight cubic magnetic components M1, a side length of each cubic magnetic component M1 is substantially 10 mm, and a thickness of each partition 112*b* is substantially 4.8 mm. Furthermore, a thickness of the casing 11*b* at the strong magnetic surface B1 is substantially 2.0 mm. Under the aforementioned configuration, the strong magnetic surface B1 formed by the magnetic component assemblies 13*b* on the casing 11*b* can achieve a magnetic field strength of approximately 3500 gauss. Under the same conditions, a conventional magnet arrangement produces a magnetic field strength of only about 50 to 300 gauss on a single surface of the casing, which is significantly weaker than the magnetic field strength generated by the magnetic component assemblies 13*b* on the strong magnetic surface B1 in this embodiment. It can be known that in the embodiments of the disclosure, by linearly arranging the cubic magnetic components with different magnetization directions, the magnetic field lines of the magnetic component assemblies can be concentrated on one side, enabling a stronger magnetic force per unit area with fewer magnetic components.

In terms of application, magnetic bead separation tests were conducted using the magnetic substance separation device 1*b* of this embodiment during a cell culture process. The initial number of added cells and magnetic beads was $5\times10^6$ each. After 14 days of co-culture, magnetic bead separation was performed using the magnetic substance separation device 1*b* of this embodiment. The results showed that with a cell number of $1\times10^6$, the residual magnetic bead number could be reduced to less than 15, or even less than 10, which meets the recommendation that the residual magnetic bead number should be less than 30.

It should be understood that the holder 15*b* and the inclined support 17*b* are optional, and the present disclosure is not limited thereto.

Third Embodiment

Figure 8:
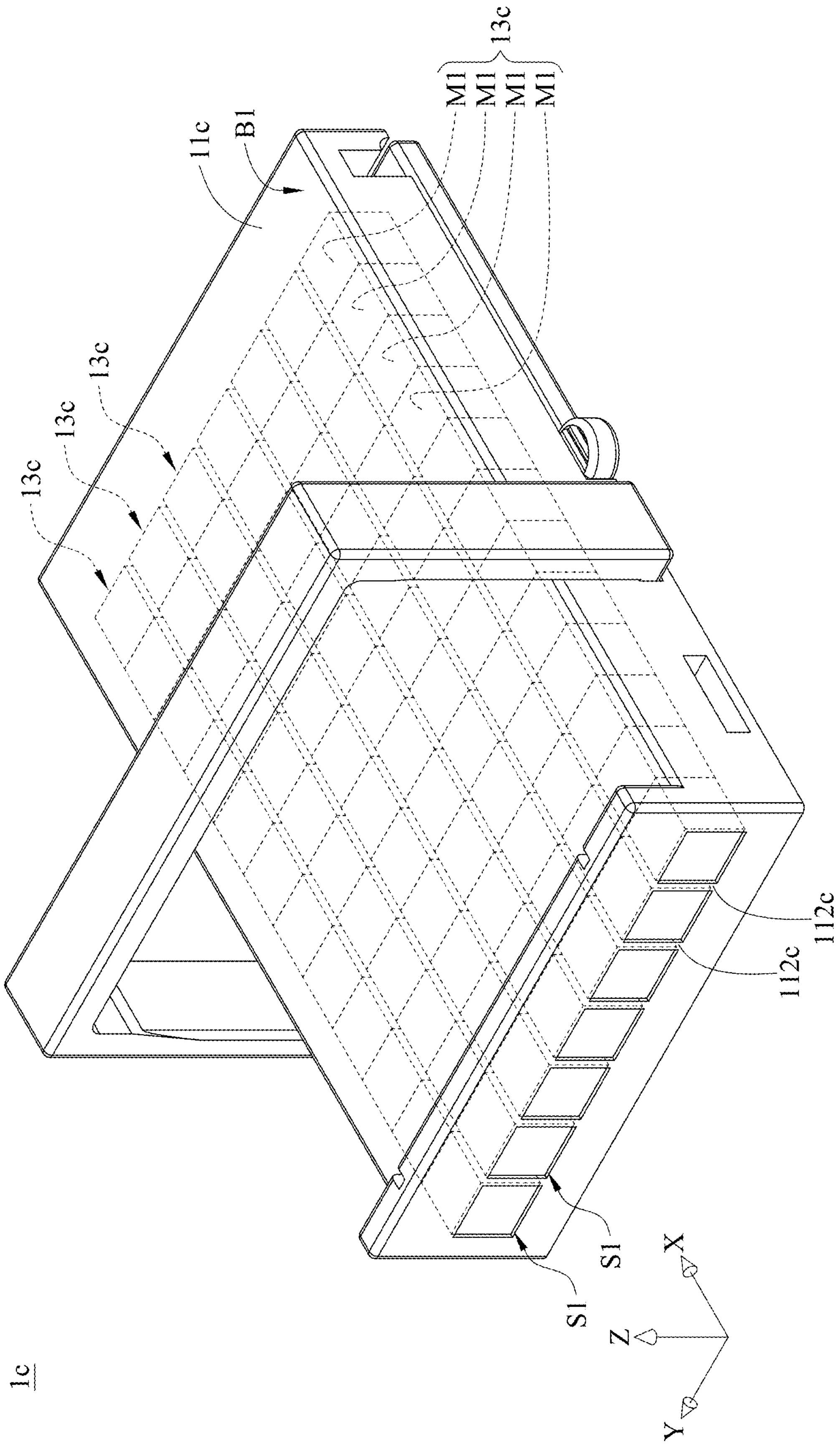
FIG. 8 is a perspective view of a magnetic substance separation device in accordance with the third embodiment of the disclosure.

Please refer to FIG. 8, which is a perspective view of a magnetic substance separation device in accordance with the third embodiment of the disclosure.

A magnetic substance separation device 1*c* provided in the third embodiment (corresponding to FIG. 8) is similar to the magnetic substance separation device 1*b* as described in the second embodiment (corresponding to FIG. 5). The same or similar reference numerals indicate the same or similar components, and functions and effects provided by those components are the same as described above, so an explanation in this regard will not be provided again. The following describes only the primary differences between the magnetic substance separation device 1*c* of the third embodiment and the magnetic substance separation device 1*b* of the second embodiment.

In the third embodiment, the number of partitions 112*c* is six, and the number of magnetic component assemblies 13*c* and the number of accommodation compartments S1 are both seven. Each of the magnetic component assemblies 13*c* includes twelve cubic magnetic components M1, a side length of each cubic magnetic component M1 is substantially 10 mm, and a thickness of each partition 112*c* is substantially 1.5 mm. Furthermore, a thickness of a casing 11*c* at a strong magnetic surface B1 is also substantially 1.5 mm. Under the aforementioned configuration, the strong magnetic surface B1 formed by the magnetic component assemblies 13*c* on the casing 11*c* can achieve a magnetic field strength of approximately 4300 gauss. Under the same conditions, a conventional magnet arrangement produces a magnetic field strength of only about 50 to 300 gauss on a single surface of the casing, which is significantly weaker than the magnetic field strength generated by the magnetic component assemblies 13*c* on the strong magnetic surface B1 in this embodiment. It can be known that in the embodiments of the disclosure, by linearly arranging the cubic magnetic components with different magnetization directions, the magnetic field lines of the magnetic component assemblies can be concentrated on one side, enabling a stronger magnetic force per unit area with fewer magnetic components.

In terms of application, magnetic bead separation tests were conducted using the magnetic substance separation device 1*c* of this embodiment during a cell culture process. The initial number of added cells and magnetic beads was $5\times10^6$ each. After 14 days of co-culture, magnetic bead separation was performed using the magnetic substance separation device 1*c* of this embodiment. The results showed that with a cell number of $1\times10^6$, the residual magnetic bead number could be reduced to less than 15, or even less than 10, which meets the recommendation that the residual magnetic bead number should be less than 30.

Moreover, the extension direction of the accommodation compartments in the casing as shown in the third embodiment differs from that as shown in the second embodiment. In the second embodiment, the accommodation compartments extend in a direction parallel to the Y-axis, while in the third embodiment, the accommodation compartments extend in a direction parallel to the X-axis. As a result, the magnetic component assemblies in these two embodiments exhibit different magnetic field distributions, but the disclosure is not limited to the extension direction of the accommodation compartments in the casing. For example, the extension direction of the accommodation compartments in the casing in the second embodiment can be adjusted, based on actual design requirements, to be parallel to the X-axis, meaning the accommodation compartments may extend along the length direction of the casing. Similarly, the extension direction of the accommodation compartments in the casing in the third embodiment can be adjusted, based on actual design requirements, to be parallel to the Y-axis, meaning the accommodation compartments may extend along the width direction of the casing.

Fourth Embodiment

Figure 9:
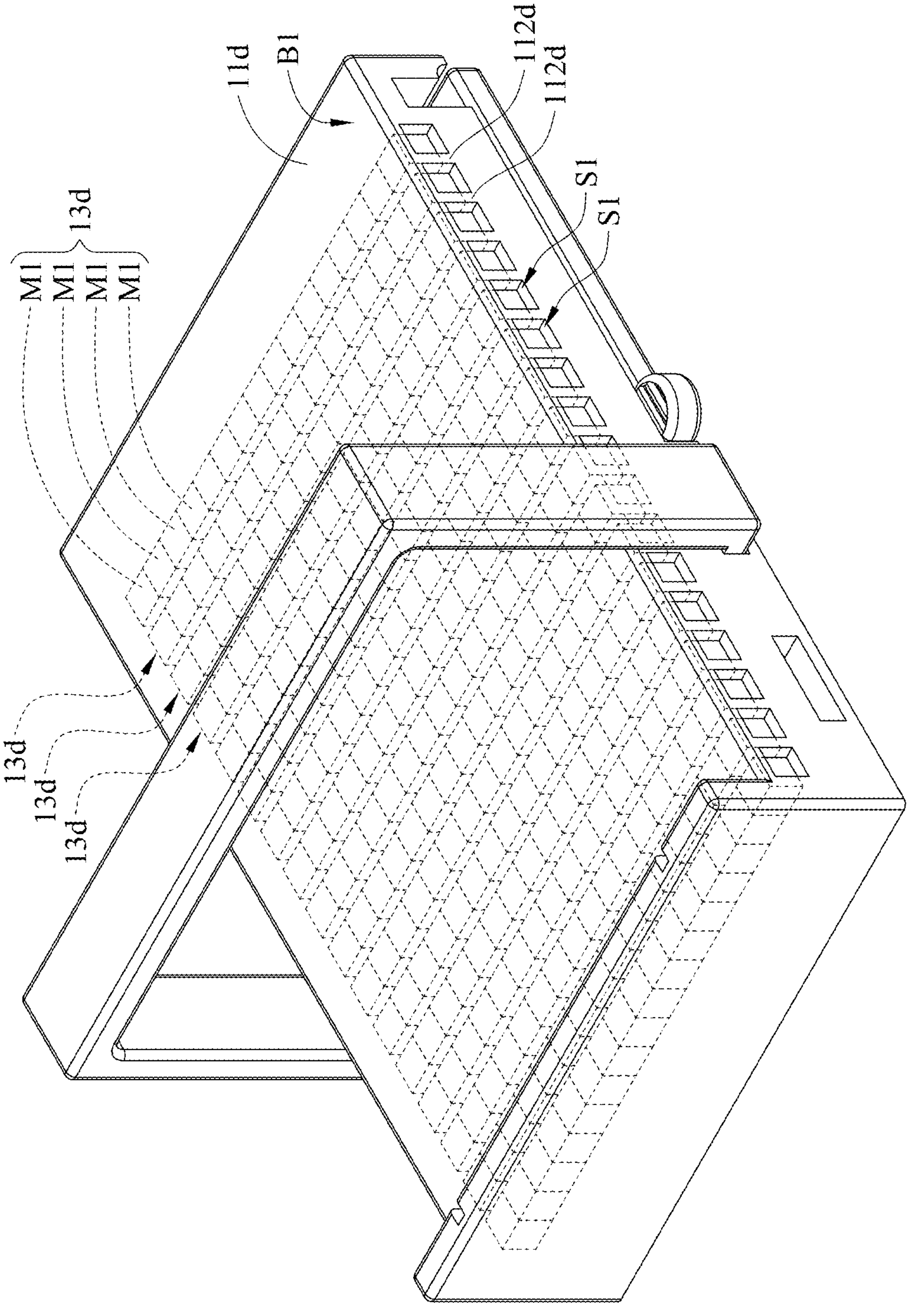
FIG. 9 is a perspective view of a magnetic substance separation device in accordance with the fourth embodiment of the disclosure.

Please refer to FIG. 9, which is a perspective view of a magnetic substance separation device in accordance with the fourth embodiment of the disclosure.

A magnetic substance separation device 1*d* provided in the fourth embodiment (corresponding to FIG. 9) is similar to the magnetic substance separation device 1*b* as described in the second embodiment (corresponding to FIG. 5). The same or similar reference numerals indicate the same or similar components, and functions and effects provided by those components are the same as described above, so an explanation in this regard will not be provided again. The following describes only the primary differences between the magnetic substance separation device 1*d* of the fourth embodiment and the magnetic substance separation device 1*b* of the second embodiment.

In the fourth embodiment, the number of partitions 112*d* is sixteen, and the number of magnetic component assemblies 13*d* and the number of accommodation compartments S1 are both seventeen. Each of the magnetic component assemblies 13*d* includes sixteen cubic magnetic components M1, a side length of each cubic magnetic component M1 is substantially 5 mm, and a thickness of each partition 112*d* is substantially 1.8 mm. Furthermore, a thickness of a casing 11*d* at a strong magnetic surface B1 is also substantially 1.8 mm. Under the aforementioned configuration, the strong magnetic surface B1 formed by the magnetic component assemblies 13*d* on the casing 11*d* can achieve a magnetic field strength of approximately at least 800 gauss. Under the same conditions, a conventional magnet arrangement produces a magnetic field strength of only about 50 to 300 gauss on a single surface of the casing, which is significantly weaker than the magnetic field strength generated by the magnetic component assemblies 13*d* on the strong magnetic surface B1 in this embodiment. It can be known that in the embodiments of the disclosure, by linearly arranging the cubic magnetic components with different magnetization directions, the magnetic field lines of the magnetic component assemblies can be concentrated on one side, enabling a stronger magnetic force per unit area with fewer magnetic components.

In terms of application, magnetic bead separation tests were conducted using the magnetic substance separation device 1*d* of this embodiment during a cell culture process. The initial number of added cells and magnetic beads was $5\times10^6$ each. After 14 days of co-culture, magnetic bead separation was performed using the magnetic substance separation device 1*d* of this embodiment. The results showed that with a cell number of $1\times10^6$, the residual magnetic bead number could be reduced to less than 15, or even less than 10, which meets the recommendation that the residual magnetic bead number should be less than 30.

Fifth Embodiment

Figure 10:
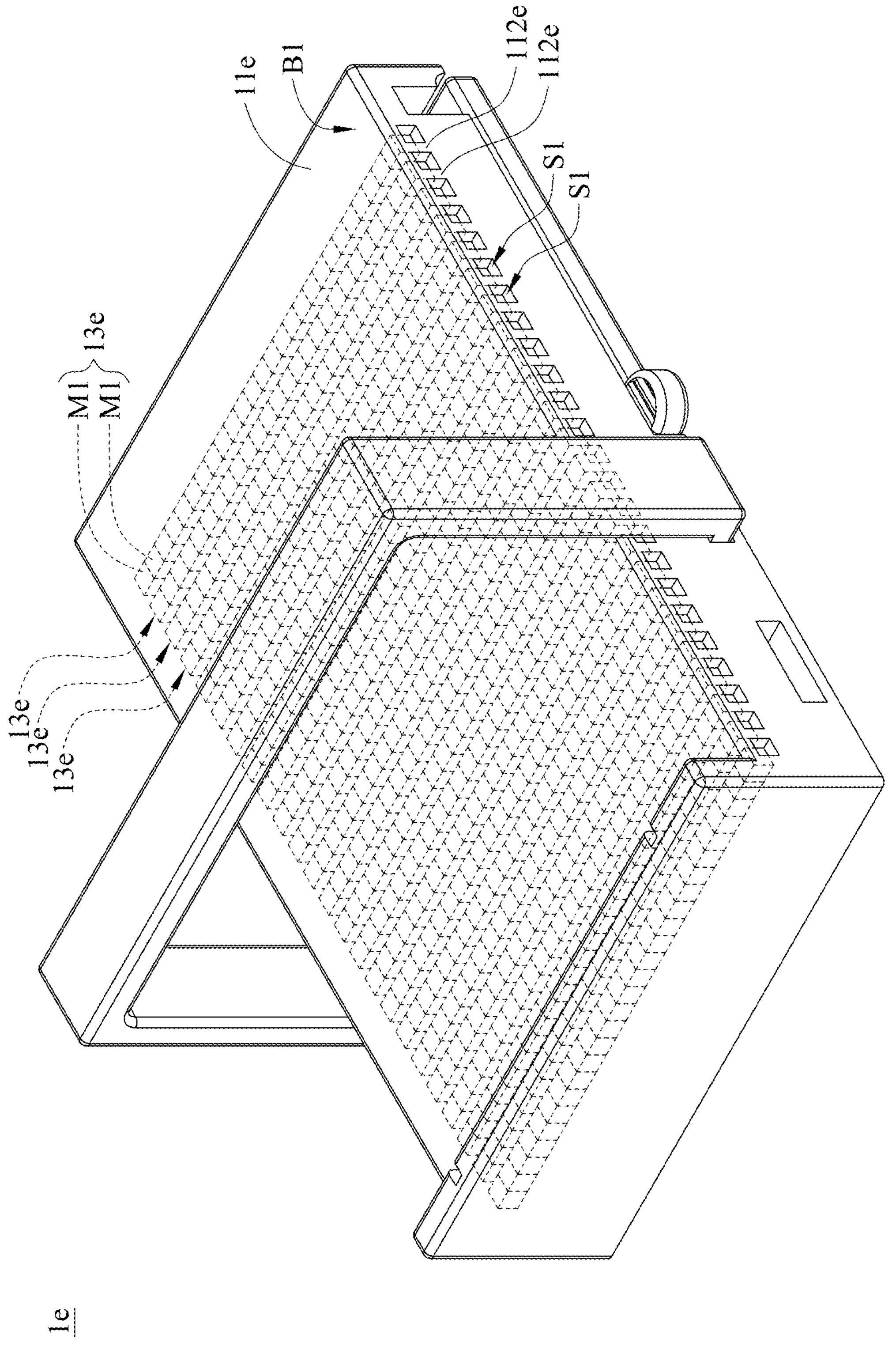
FIG. 10 is a perspective view of a magnetic substance separation device in accordance with the fifth embodiment of the disclosure.

Please refer to FIG. 10, which is a perspective view of a magnetic substance separation device in accordance with the fifth embodiment of the disclosure.

A magnetic substance separation device 1*e* provided in the fifth embodiment (corresponding to FIG. 10) is similar to the magnetic substance separation device 1*b* as described in the second embodiment (corresponding to FIG. 5). The same or similar reference numerals indicate the same or similar components, and functions and effects provided by those components are the same as described above, so an explanation in this regard will not be provided again. The following describes only the primary differences between the magnetic substance separation device 1*e* of the fifth embodiment and the magnetic substance separation device 1*b* of the second embodiment.

In the fifth embodiment, the number of partitions 112*e* is twenty-three, and the number of magnetic component assemblies 13*e* and the number of accommodation compartments S1 are both twenty-four. Each of the magnetic component assemblies 13*e* includes twenty-six cubic magnetic components M1, a side length of each cubic magnetic component M1 is substantially 3 mm, and a thickness of each partition 112*e* is substantially 1.8 mm. Furthermore, a thickness of a casing 11*e* at a strong magnetic surface B1 is also substantially 1.8 mm. Under the aforementioned configuration, the strong magnetic surface B1 formed by the magnetic component assemblies 13*e* on the casing 11*e* can achieve a magnetic field strength of approximately at least 800 gauss. Under the same conditions, a conventional magnet arrangement produces a magnetic field strength of only about 50 to 300 gauss on a single surface of the casing, which is significantly weaker than the magnetic field strength generated by the magnetic component assemblies 13*e* on the strong magnetic surface B1 in this embodiment. It can be known that in the embodiments of the disclosure, by linearly arranging the cubic magnetic components with different magnetization directions, the magnetic field lines of the magnetic component assemblies can be concentrated on one side, enabling a stronger magnetic force per unit area with fewer magnetic components.

In terms of application, magnetic bead separation tests were conducted using the magnetic substance separation device 1*e* of this embodiment during a cell culture process. The initial number of added cells and magnetic beads was $5\times10^6$ each. After 14 days of co-culture, magnetic bead separation was performed using the magnetic substance separation device 1*e* of this embodiment. The results showed that with a cell number of $1\times10^6$, the residual magnetic bead number could be reduced to less than 15, or even less than 10, which meets the recommendation that the residual magnetic bead number should be less than 30.

Sixth Embodiment

Figure 11:
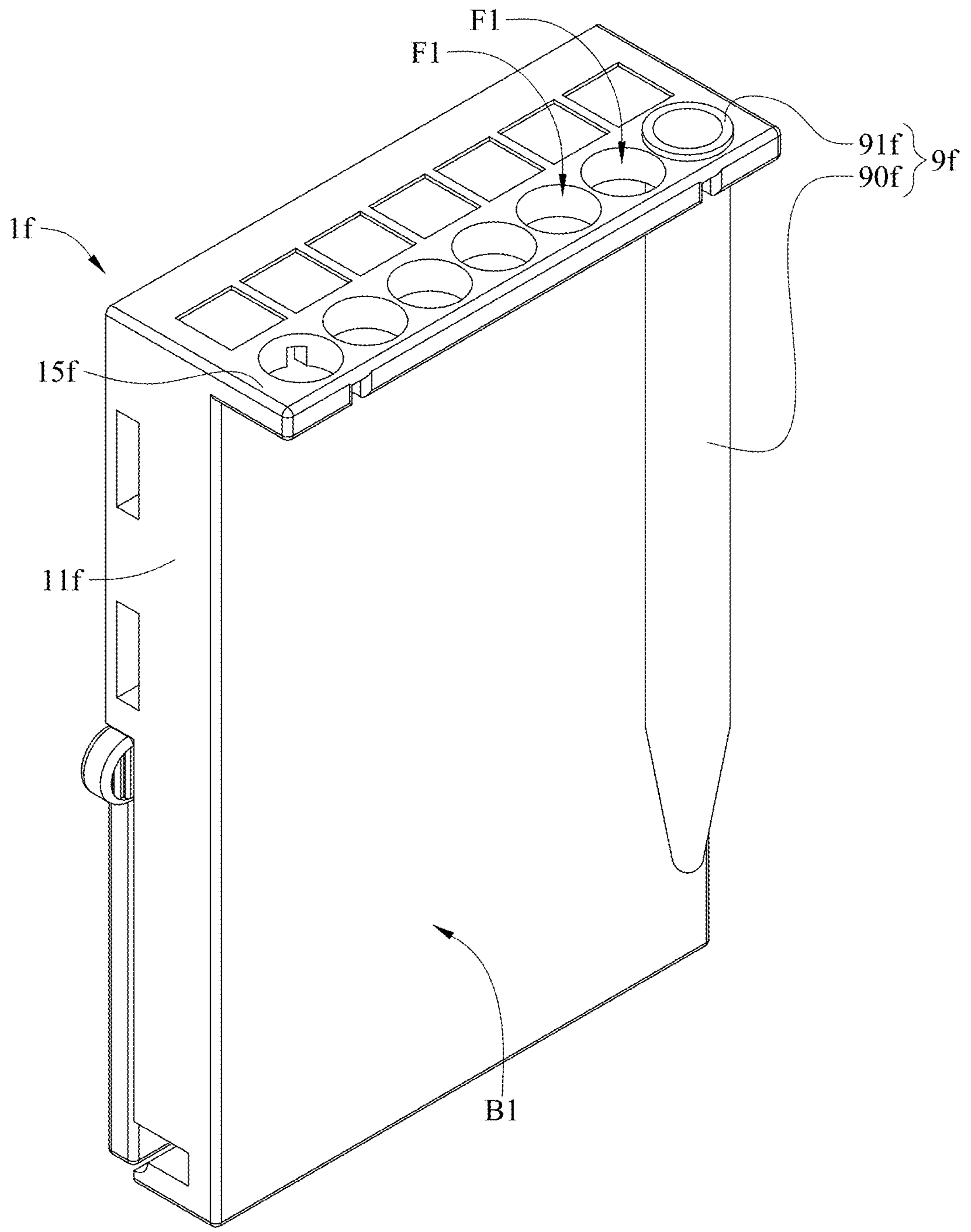
FIG. 11 is a perspective view of a sample container and a magnetic substance separation device in accordance with the sixth embodiment of the disclosure.

Please refer to FIG. 11, which is a perspective view of a sample container and a magnetic substance separation device in accordance with the sixth embodiment of the disclosure.

A magnetic substance separation device 1*f* provided in the sixth embodiment (corresponding to FIG. 11) is similar to the magnetic substance separation devices as described in the above embodiments. The same or similar reference numerals indicate the same or similar components, and functions and effects provided by those components are the same as described above, so an explanation in this regard will not be provided again. The following describes only the primary differences between the magnetic substance separation device 1*f* of the sixth embodiment and the magnetic substance separation devices of the above embodiments.

In the sixth embodiment, a sample container 9*f* may be a biocompatibility-certified centrifuge tube, specifically, for example, a 15 mL, 25 mL, or 50 mL centrifuge tube. Alternatively, the sample container 9*f* may be a biocompatibility-certified microcentrifuge tube (also known as an Eppendorf tube), specifically, for example, a 5 mL, 2 mL, or 1.5 mL microcentrifuge tube. A holder 15*f* of the magnetic substance separation device 1*f* is configured to secure the sample container 9*f* onto a strong magnetic surface B1 of a casing 11*f*.

In detail, the holder 15*f* is a support frame disposed on an upper end of the casing 11*f*. The holder 15*f* has a through hole F1 configured for a tube part 90*f* of the sample container 9*f* to be disposed through, allowing the tube part 90*f* to correspond to the strong magnetic surface B1, and a periphery of the through hole F1 is configured to support an opening flange part 91*f* of the sample container 9*f*.

In the sixth embodiment, the number of magnetic component assemblies and the number of accommodation compartments are both seven. Each magnetic component assembly includes twelve cubic magnetic components, and a side length of each cubic magnetic component is substantially 10 mm. The number of partitions respectively positioned between two adjacent accommodation compartments is six, and a thickness of each partition is substantially 1.5 mm. Furthermore, a thickness of the casing 11*f* at the strong magnetic surface B1 is also substantially 1.5 mm. Under the aforementioned configuration, the strong magnetic surface B1 formed by the magnetic component assemblies on the casing 11*f* can achieve a magnetic field strength of approximately 4300 gauss. Under the same conditions, a conventional magnet arrangement produces a magnetic field strength of only about 50 to 300 gauss on a single surface of the casing, which is significantly weaker than the magnetic field strength generated by the magnetic component assemblies on the strong magnetic surface B1 in this embodiment. It can be known that in the embodiments of the disclosure, by linearly arranging the cubic magnetic components with different magnetization directions, the magnetic field lines of the magnetic component assemblies can be concentrated on one side, enabling a stronger magnetic force per unit area with fewer magnetic components.

In terms of application, magnetic bead separation tests were conducted using the magnetic substance separation device 1*f* of this embodiment during a cell culture process. The initial number of added cells and magnetic beads was $5\times10^6$ each. After 14 days of co-culture, magnetic bead separation was performed using the magnetic substance separation device 1*f* of this embodiment. The results showed that with a cell number of $1\times10^6$, the residual magnetic bead number could be reduced to less than 15, or even less than 10, which meets the recommendation that the residual magnetic bead number should be less than 30.

As seen from the first to the sixth embodiments described above, the magnetic substance separation devices of the present disclosure can be configured in various ways, allowing the magnetic substance separation device to adapt to different scenarios and sample requirements. Furthermore, experiments conducted using suitable sample containers demonstrate that, with a cell number of $1\times10^6$, the magnetic substance separation devices are capable of meeting the recommended residual magnetic bead number of less than 30. Additionally, in these experiments, the cell loss rate was controlled at approximately 10%, and the cell viability was maintained above 94.1%.

According to the magnetic substance separation device as disclosed in the above embodiments, by arranging the cubic magnetic components in a specific manner, a strong magnetic surface can be formed on the casing, enabling stronger magnetic force per unit area with fewer magnetic components. Furthermore, the magnetic substance separation device can be adjusted to adapt to different container shapes, thereby enhancing the efficiency of magnetic interactions while meeting requirements for efficiency, convenience, automation, biosafety and biocompatibility.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A magnetic substance separation device, configured for attracting magnetic substances in a sample within a sample container, and the magnetic substance separation device comprising:

a casing, comprising a main housing, a plurality of partitions and a base, the plurality of partitions are arranged in the main housing to form a plurality of parallel elongated grooves on the main housing, the base is secured to the main housing for forming a plurality of accommodation compartments together with the main housing and the plurality of partitions, and the base having a plurality of openings respectively connected to the plurality of accommodation compartments;

a holder, disposed on an upper end of the casing and including a through hole, wherein the holder is configured to secure the sample container onto the at least one strong magnetic surface of the casing, and the through hole is configured for a tube part of the sample container to be disposed through, allowing the tube part to correspond to the at least one strong magnetic surface, and a periphery of the through hole is configured to support an opening flange part of the sample container;

an inclined support pivotally coupled to an end of the casing, wherein the inclined support is configured to selectively raise a horizontal height of the end of the casing to be greater than or equal to a horizontal height of other parts of the casing; and at least one magnetic component assembly, comprising at least four cubic magnetic components, the at least four cubic magnetic components are inserted into the accommodation compartments through the plurality of openings, wherein the at least four cubic magnetic components in one of the plurality of accommodation compartments are arranged in an offset configuration relative to the at least four cubic magnetic components in another of the plurality of accommodation compartments;

wherein the at least four cubic magnetic components are linearly arranged with different magnetization directions, allowing magnetic field lines of the at least one magnetic component assembly to concentrate on one side, such that the at least one magnetic component assembly forms at least one strong magnetic surface on the casing, and the at least one strong magnetic surface is configured to attract the magnetic substances in the sample within the sample container.

2. The magnetic substance separation device according to claim 1, wherein the at least four cubic magnetic components are arranged in Halbach array.

3. The magnetic substance separation device according to claim 1, wherein the at least one magnetic component assembly further forms a weak magnetic surface on the casing, and the weak magnetic surface and the at least one strong magnetic surface are located on opposite sides of the casing.

4. The magnetic substance separation device according to claim 1, wherein the at least one magnetic component assembly comprises a plurality of magnetic component assemblies, and the plurality of magnetic component assemblies are respectively disposed in the plurality of accommodation compartments.

5. The magnetic substance separation device according to claim 4, wherein each two adjacent cubic magnetic components within the same accommodation compartment are in physical contact with each other.

6. The magnetic substance separation device according to claim 4, wherein the casing has a plurality of partitions, the plurality of partitions are respectively disposed between two adjacent accommodation compartments, a thickness of each of the plurality of partitions ranges from 1.0 mm to 10.0 mm, and a thickness of the casing at the at least one strong magnetic surface ranges from 1.0 mm to 10.0 mm.

7. The magnetic substance separation device according to claim 1, wherein the at least one magnetic component assembly is in physical contact with an inner peripheral surface of at least one accommodation compartment.

8. The magnetic substance separation device according to claim 1, wherein a side length of each cubic magnetic component ranges from 1 mm to 15 mm.

* * * * *